(12) United States Patent
Allen

(10) Patent No.: US 9,663,129 B1
(45) Date of Patent: May 30, 2017

(54) SPRING LOADED NOSE PLATE FOR A HAND TRUCK

(71) Applicant: Rodney Allen, Ashland City, TN (US)

(72) Inventor: Rodney Allen, Ashland City, TN (US)

( * ) Notice: Subject to any disclaimer, the term of this patent is extended or adjusted under 35 U.S.C. 154(b) by 0 days.

(21) Appl. No.: 15/232,049

(22) Filed: Aug. 9, 2016

(51) Int. Cl.
    *B62B 1/12*   (2006.01)
(52) U.S. Cl.
    CPC ...................... *B62B 1/12* (2013.01)
(58) Field of Classification Search
    CPC ................ B62B 1/12; B62B 1/00; B62B 1/04
    See application file for complete search history.

(56) References Cited

U.S. PATENT DOCUMENTS

| | | |
|---|---|---|
| 2,598,489 A | 5/1952 | Bayer |
| 2,981,374 A | 4/1961 | Holsclaw |
| 5,575,605 A | 11/1996 | Fisher |
| 6,309,168 B1 | 10/2001 | Holmes |
| 2,427,803 A1 | 11/2003 | Mann |
| 8,459,515 B1 * | 6/2013 | Weis ....................... B62B 1/002 224/401 |
| 8,550,476 B1 * | 10/2013 | Whinnery ................. B62B 1/12 280/47.18 |
| 8,840,121 B2 | 9/2014 | Reeves |

* cited by examiner

*Primary Examiner* — John Walters
*Assistant Examiner* — James Triggs
(74) *Attorney, Agent, or Firm* — Kyle A. Fletcher, Esq.

(57) ABSTRACT

The spring-loaded nose plate for a hand truck is an improved hand truck. The nose plate of the hand truck is able to move up and down relative to the frame of the hand truck. The frame of the hand truck includes a cylinder that includes a spring nested inside. The nose plate is able to move up or down tracks provided on opposing sides of the frame of the hand truck. A piston is affixed to the nose plate. The piston extends upwardly and enters the cylinder. The spring located inside of the cylinder imparts an upward bias onto the piston and the nose plate such that when the nose plate is free of an item, the nose plate rests at a topmost position relative the tracks provided on the frame of the hand truck.

8 Claims, 5 Drawing Sheets

SPRING LOADED NOSE PLATE FOR A HAND TRUCK

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of hand trucks, more specifically, a hand truck that includes a nose plate that is spring-loaded so as to raise and lower itself depending upon weight of items placed thereon or removed there from.

The spring-loaded nose plate for a hand truck is an improvement over a traditional hand truck. The nose plate of a traditional hand truck is fixed and does not move relative the frame of the hand truck.

When loading items onto a traditional hand truck, the end user has to gently place the item(s) onto the nose plate. This can be time consuming and a burden where the item is heavy or large. A need exists over traditional hand trucks. This need is to assist or aid in placing items upon or removing items from the nose plate so as to create a hand truck that is more user friendly.

The device of the present application addresses this need by providing a nose plate that is able to move up or down with respect to the frame of the hand truck in order to receive items and gently lower to a bottommost position, or raise up with the items as the items are being moved with respect to the frame of the hand truck.

SUMMARY OF INVENTION

The spring-loaded nose plate for a hand truck is an improved hand truck. The nose plate of the hand truck is able to move up and down relative to the frame of the hand truck. The frame of the hand truck includes a cylinder that includes a spring nested inside. The nose plate is able to move up or down tracks provided on opposing sides of the frame of the hand truck. A piston is affixed to the nose plate. The piston extends upwardly and enters the cylinder. The spring located inside of the cylinder imparts an upward bias onto the piston and the nose plate such that when the nose plate is free of an item, the nose plate rests at a topmost position relative the tracks provided on the frame of the hand truck.

It is an object of the invention to provide a hand truck that includes a nose plate that can move up or down with respect to the frame of the hand truck.

A further object of the invention is for the nose plate to be biased in an upward orientation such that at rest, the nose plate is located at a topmost position relative the frame of the hand truck.

A further object of the invention is for the nose plate to rise upwardly as an item is being lifted or removed from the nose plate thereby reducing the burden on an end user lifting said item.

An even further object of the invention is for the spring that imparts a biasing force on the nose plate to be adjustable in order to increase or decrease the biasing force imparted via the spring.

These together with additional objects, features and advantages of the spring-loaded nose plate for a hand truck will be readily apparent to those of ordinary skill in the art upon reading the following detailed description of the presently preferred, but nonetheless illustrative, embodiments when taken in conjunction with the accompanying drawings.

In this respect, before explaining the current embodiments of the spring-loaded nose plate for a hand truck in detail, it is to be understood that the spring-loaded nose plate for a hand truck is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the spring-loaded nose plate for a hand truck.

It is therefore important that the claims be regarded as including such equivalent construction insofar as they do not depart from the spirit and scope of the spring-loaded nose plate for a hand truck. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figures 1, 2:
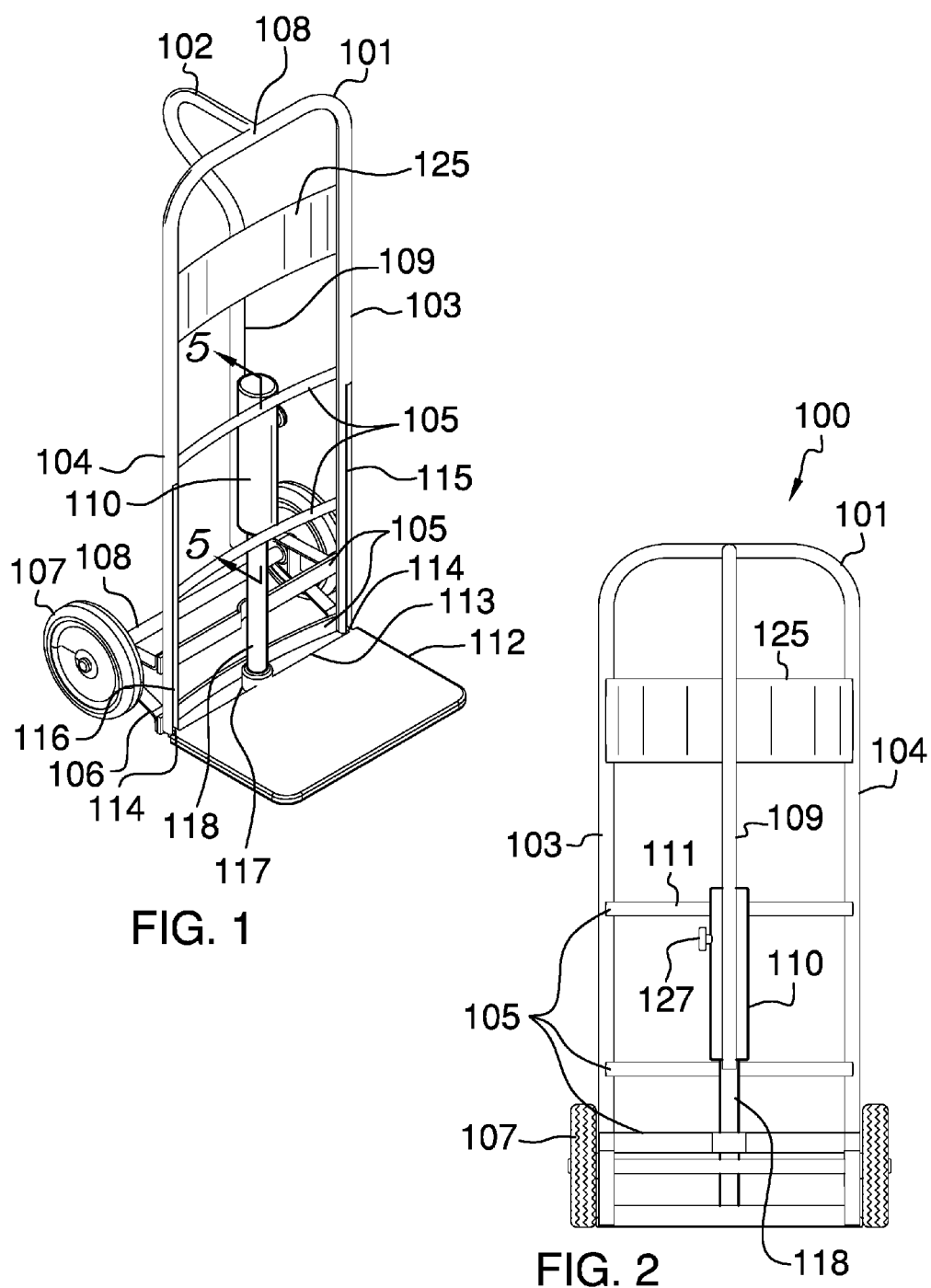
FIG. 1 is a perspective view of an embodiment of the disclosure.
FIG. 2 is a rear view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 6.

The spring-loaded nose plate for a hand truck 100 (hereinafter invention) comprises a frame 101 that is further defined with a handle 102, a left vertical member 103, a right vertical member 104, a plurality of cross-braces 105, a pair of wheel armatures 106, a pair of wheels 107, and an axle 108.

The plurality of cross-braces 105 spans between the left vertical member 103 and the right vertical member 104. The left vertical member 103 is generally parallel with respect to the right vertical member 104. The plurality of cross-braces 105 are depicted with a slight bend that extends rearwardly with respect to the pair of wheels 107. The handle 102 intersects at a top, middle point 108 with the frame 101. The handle 102 has a curvature that extends rearwardly as well as downwardly.

The handle 102 is further defined with a handle armature 109. The handle armature 109 is generally vertical, and parallel with the left vertical member 103 as well as the right vertical member 104. The invention 100 includes a cylinder 110, which is affixed to a rear brace surface 111 of the plurality of cross-braces 105. Moreover, the cylinder 110 is sandwiched between the handle armature 109 and the plurality of cross-braces 105. The cylinder 110 is also generally parallel with respect to the handle armature 109, the left vertical member 103, and the right vertical member 104.

The invention 100 includes a nose plate 112. The nose plate 112 is a planar object that has a generally rectangular shape when viewed from above. The nose plate 112 is adapted to receive items 300 thereon. Moreover, the nose plate 112 maintains a perpendicular orientation with respect to the left vertical member 103 as well as the right vertical member 104. The nose plate 112 is further defined with a rear nose edge 113 that is adjacent to the frame 101 of the invention 100. Moreover, the rear nose edge 113 of the nose plate 112 includes a pair of track slide members 114. The pair of track slide members 114 are provided at rear corners of the nose plate 112, and interface with a left track 115 of the left vertical member 103 and a right track 116 of the right vertical member 104.

Figure 4:
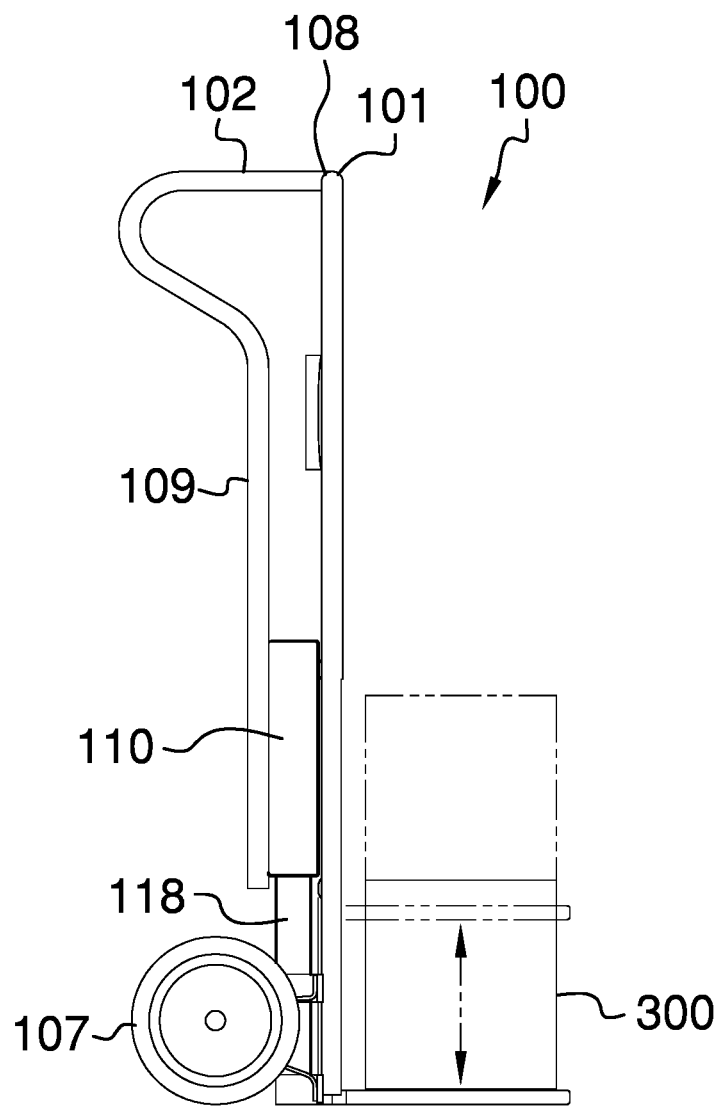
FIG. 4 is a side view of an embodiment of the disclosure.

The pair of track slide members 114 of the nose plate 112 enable the nose plate 112 to slide up and down the left track 115 and the right track 116 while maintaining a perpendicular arrangement with respect to the left vertical member 103 and the right vertical member 104 (see FIG. 4). The nose plate 112 includes a rear bracket 117, which extends rear of the rear nose edge 113. The rear bracket 117 enables a piston 118 to attach to the nose plate 112. The piston 118 extends upwardly with respect to the nose plate 112. The piston 118 extends upwardly and enters into the cylinder 110. Located inside of the cylinder 110 is a spring 119 that biases the piston 118 upwardly so as to automatically raise the nose plate 112 up when no item 300 is placed onto the nose plate 112 or when an item 300 is being lifted upwardly with the nose plate 112.

Figure 5:
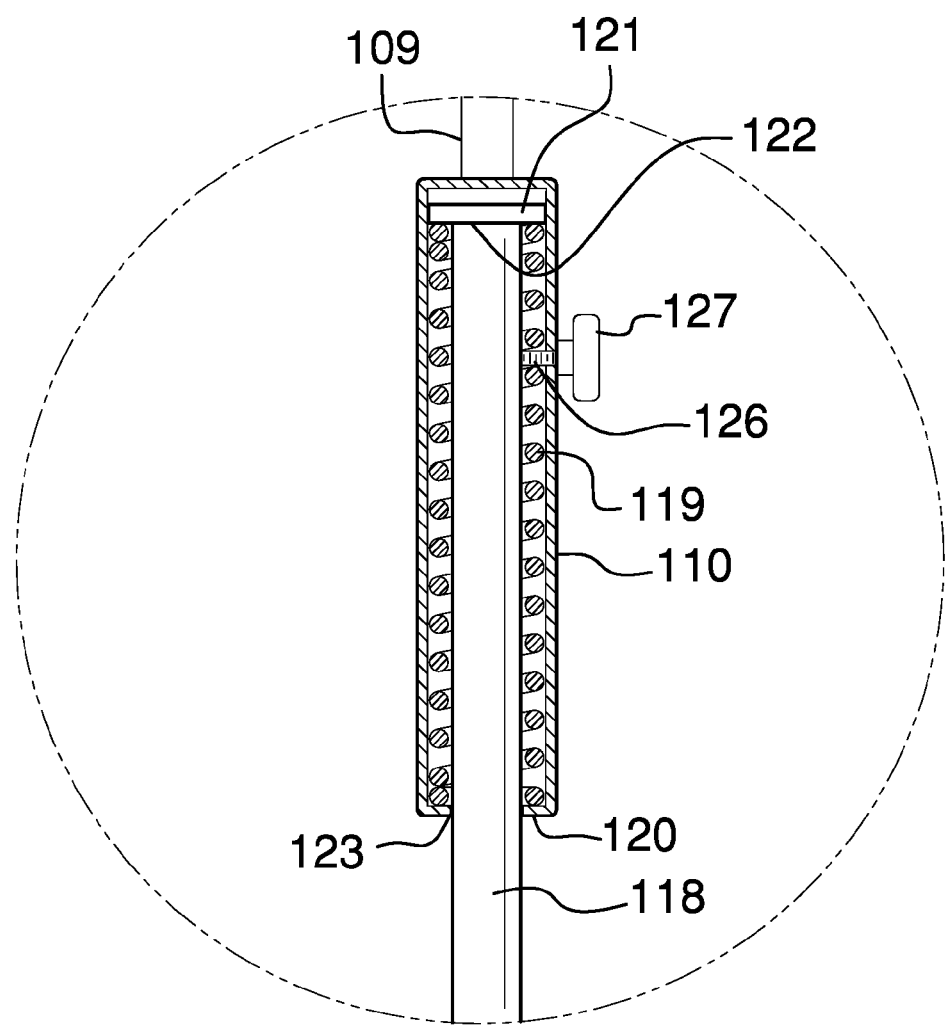
FIG. 5 is a cross-sectional view of an embodiment of the disclosure across 5-5 as shown in FIG. 1.

Referring to FIG. 5, the spring 119 is nested within the cylinder 110, which implies that the cylinder is of hollowed construction. Moreover, the spring 119 interfaces between a bottom cylinder surface 120 of the cylinder 110 and a collar 121 mounted atop of the piston 118. The collar 121 is rigidly affixed to a topmost end 122 of the piston 118. The cylinder 110 is further defined with a piston outlet 123 provided on the bottom cylinder surface 120, which enables the piston 118 to slide up and down within the cylinder 110.

It shall be noted that the cross-braces 105 extend between the left vertical member 103 and the right vertical member 104. Moreover, the plurality of cross-braces 105 may include bends that contour around the piston 118 and the rear bracket 117 so as to facilitate the vertical movement of the nose plate 112. Referring to FIG. 1, the plurality of cross-braces 105 intersect between the left vertical member 103 and the right vertical member 104 amongst the area where the pair of wheels 107 is provided as well as the span of the piston 118 and the cylinder 110. Located above the plurality of cross-braces 105 is a topmost brace member 125. The topmost brace member 125 attaches to both the left vertical member 103 and the right vertical member 104. The topmost brace member 125 has a curvature that extends rearwardly. The topmost brace member 125 is located below the handle 102, and is affixed to the handle armature 109.

The cylinder 110 may include a spring regulator 126. The spring regulator 126 is a glorified pin that extends inwardly of the cylinder 110 in order to govern the range of motion of the spring 119 provided therein. The spring regulator 126 includes a knob 127 to insert and remove the spring regulator 126 with respect to the cylinder 110.

Figure 3:
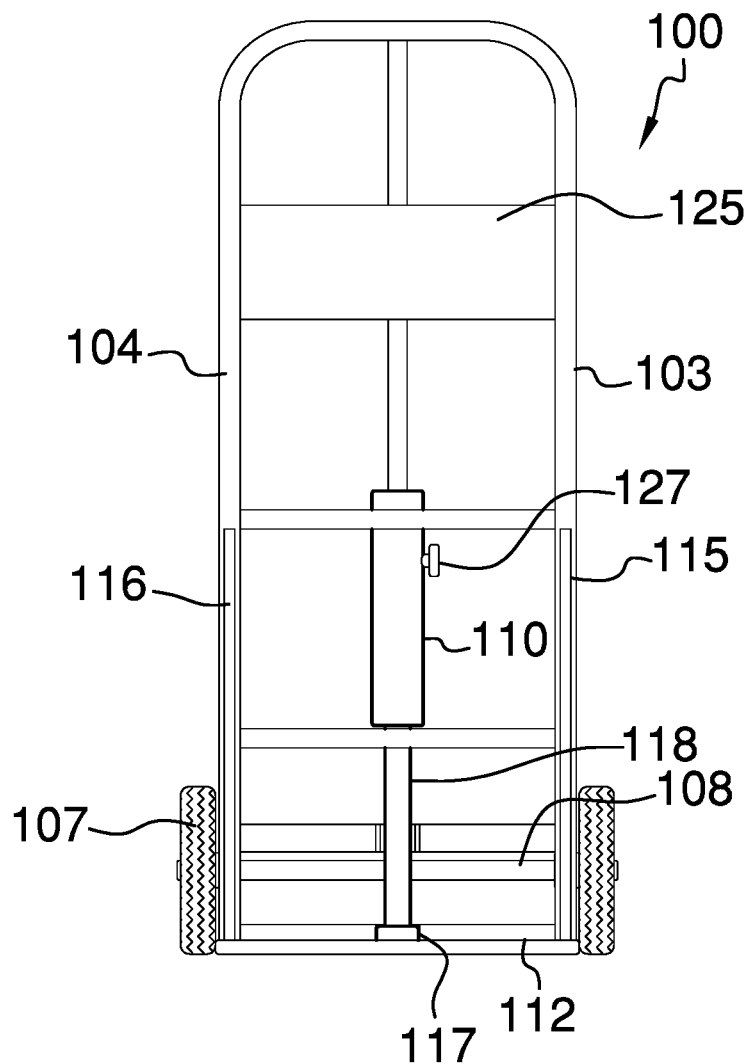
FIG. 3 is a front view of an embodiment of the disclosure.
Figure 6:
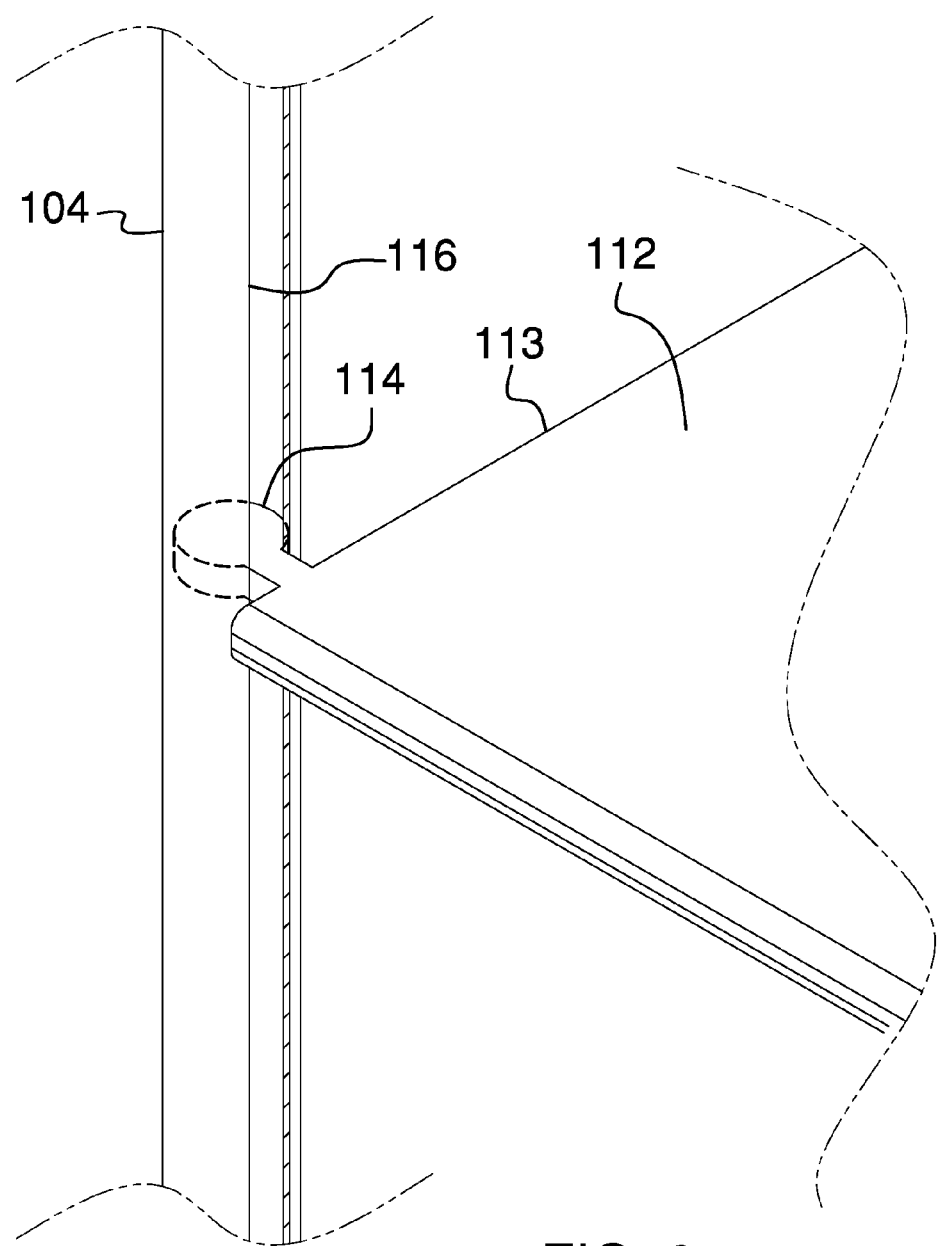
FIG. 6 is a partial cut-away view of componentry associated with an embodiment of the disclosure.

The left track 115 of the left vertical member 103 and the right track 116 of the right vertical member 104 are further defined as slots that are cutout out of the left vertical member 103 and the right vertical member 104. Referring to FIG. 3, the left track 115 and the right track 116 resemble elongated slots that extend vertically along a front portion of the left vertical member 103 and the right vertical member 104. Referring to FIG. 6, the track slide members 114 of the nose plate 112 resemble discs that extend rearwardly of the rear nose edge 113, and contour to an interior of the left vertical member 103 and the right vertical member 104.

It shall be noted that with the exception of the pair of wheels 107, all componentry of the invention 100 may be made of a material comprising a plastic, wood, carbon fiber composite, or a metal.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A hand truck comprising:
   a nose plate that is able to move up or down with respect to a frame in order to aid in adaptively placing or removing at least one item with respect to said hand truck;
   wherein the frame is further defined with a handle, a left vertical member, a right vertical member, a plurality of cross-braces, a pair of wheel armatures, a pair of wheels, and an axle;
   wherein the plurality of cross-braces spans between the left vertical member and the right vertical member;

wherein the left vertical member is generally parallel with respect to the right vertical member;

wherein the axle is attached to the pair of wheels; wherein the pair of wheel armatures each attach to both the left vertical member and the right vertical member;

wherein the pair of wheel armatures extend rearwardly and support the axle and the pair of wheels from behind the left vertical member and the right vertical member;

wherein the handle intersects at a top, middle point with the frame;

wherein the handle has a curvature that extends rearwardly as well as downwardly;

wherein the handle is further defined with a handle armature;

wherein the handle armature is generally vertical, and parallel with the left vertical member as well as the right vertical member;

wherein a cylinder is affixed to a rear brace surface of the plurality of cross-braces;

wherein the cylinder is sandwiched between the handle armature and the plurality of cross-braces;

wherein the cylinder is generally parallel with respect to the handle armature, the left vertical member, and the right vertical member;

wherein the nose plate is a planar object that has a generally rectangular shape when viewed from above;

wherein both the nose plate and the plurality of cross-braces are adapted to support and interface with said at least one item;

wherein the nose plate maintains a perpendicular orientation with respect to the left vertical member as well as the right vertical member;

wherein the nose plate is further defined with a rear nose edge that is adjacent to the frame;

wherein the rear nose edge of the nose plate includes a pair of track slide members;

wherein the pair of track slide members are provided at rear corners of the nose plate, and interface with a left track of the left vertical member and a right track of the right vertical member.

2. The hand truck according to claim 1 wherein the plurality of cross-braces are further defined with a slight bend that extends rearwardly with respect to the pair of wheels.

3. The hand truck according to claim 1 wherein the pair of track slide members of the nose plate enable the nose plate to slide up and down the left track and the right track while maintaining a perpendicular arrangement with respect to the left vertical member and the right vertical member.

4. The hand truck according to claim 3 wherein the nose plate includes a rear bracket, which extends rear of the rear nose edge.

5. The hand truck according to claim 4 wherein the rear bracket enables a piston to attach to the nose plate; wherein the piston extends upwardly with respect to the nose plate; wherein the piston extends upwardly and enters into the cylinder; wherein located inside of the cylinder is a spring that biases the piston upwardly so as to automatically raise the nose plate.

6. The hand truck according to claim 5 wherein the spring is nested within the cylinder; wherein the spring interfaces between a bottom cylinder surface of the cylinder and a collar mounted atop of the piston; wherein the collar is rigidly affixed to a topmost end of the piston.

7. The hand truck according to claim 6 wherein the cylinder is further defined with a piston outlet provided on the bottom cylinder surface, which enables the piston to slide up and down within the cylinder.

8. The hand truck according to claim 7 wherein located above the plurality of cross-braces is a topmost brace member; wherein the topmost brace member attaches to both the left vertical member and the right vertical member; wherein the topmost brace member has a curvature that extends rearwardly; wherein the topmost brace member is located below the handle, and is affixed to the handle armature; wherein the cylinder includes a spring regulator; wherein the spring regulator extends inwardly of the cylinder in order to govern the range of motion of the spring provided therein; wherein the spring regulator includes a knob to insert and remove the spring regulator with respect to the cylinder; wherein the left track of the left vertical member and the right track of the right vertical member are further defined as slots that are cutout out of the left vertical member and the right vertical member; wherein the left track and the right track resemble elongated slots that extend vertically along a front portion of the left vertical member and the right vertical member, respectively; wherein the track slide members of the nose plate resemble discs that extend rearwardly of the rear nose edge, and contour to an interior of the left vertical member and the right vertical member.

* * * * *